(12) United States Patent
Pierce

(10) Patent No.: US 11,771,540 B2
(45) Date of Patent: Oct. 3, 2023

(54) SUPPORT DEVICE FOR QUADRUPEDS

(71) Applicant: Upright Ideas LLC, Beaverton, OR (US)

(72) Inventor: Huma Qureshi Pierce, Portland, OR (US)

(73) Assignee: Upright Ideas LLC, Beaverton, OR (US)

( * ) Notice: Subject to any disclaimer, the term of this patent is extended or adjusted under 35 U.S.C. 154(b) by 185 days.

(21) Appl. No.: 17/081,899

(22) Filed: Oct. 27, 2020

(65) Prior Publication Data

US 2021/0121278 A1 Apr. 29, 2021

Related U.S. Application Data

(60) Provisional application No. 62/927,069, filed on Oct. 28, 2019.

(51) Int. Cl.
| | |
|---|---|
| *A01D 9/00* | (2006.01) |
| *A01K 13/00* | (2006.01) |
| *A61D 9/00* | (2006.01) |
| *B68B 7/00* | (2006.01) |
| *B68C 5/00* | (2006.01) |

(52) U.S. Cl.
CPC .............. *A61D 9/00* (2013.01); *A01K 13/006* (2013.01); *A01K 13/008* (2013.01); *B68B 7/00* (2013.01); *B68C 5/00* (2013.01)

(58) Field of Classification Search
CPC ...... A01K 13/006; A01K 13/008; A61D 9/00; B68C 5/00; B68B 7/00
See application file for complete search history.

(56) References Cited

U.S. PATENT DOCUMENTS

| | | | |
|---|---|---|---|
| 6,267,083 B1 * | 7/2001 | Chimienti | A01K 13/006 119/850 |
| 8,733,296 B1 * | 5/2014 | Douglas | A01K 13/006 119/856 |
| 9,258,981 B2 * | 2/2016 | Bragion | A61D 9/00 |
| RE46,069 E * | 7/2016 | GibsonHorn | A63B 21/4005 |
| 2004/0244725 A1 * | 12/2004 | Hartman | A61D 9/00 119/856 |
| 2007/0056530 A1 * | 3/2007 | Nassour | A01K 13/006 119/850 |

(Continued)

OTHER PUBLICATIONS

"ThunderShirt," ThunderShirt Website, Available Online at https://thundershirt.com/, Available as Early as Nov. 27, 2001, 4 pages.

(Continued)

*Primary Examiner* — Monica L Perry
(74) *Attorney, Agent, or Firm* — McCoy Russell LLP

(57) ABSTRACT

A compression wrap garment integrally knit with variable or uniform compression areas for quadruped support, protection from further injury and post-surgical support. The compression wrap garments and embodiments can be used in concert with existing modified garments, encircling the forelegs and or hind legs and torso, if necessary, of a quadruped to provide support, rest, surface guarding, and tension to animals suffering from degenerative, surface, or deep spinal diseases including or excluding extremity trauma. The variable compression may be graded or independently distributed in a continuous nor non-continuous manner.

12 Claims, 10 Drawing Sheets

(56) References Cited

U.S. PATENT DOCUMENTS

| | | | |
|---|---|---|---|
| 2013/0008393 A1* | 1/2013 | Backman | A61D 9/00 |
| | | | 119/850 |
| 2015/0156987 A1* | 6/2015 | Baynes | A01K 13/006 |
| | | | 119/850 |
| 2017/0290293 A1* | 10/2017 | Spanovic | A01K 13/006 |
| 2018/0288970 A1* | 10/2018 | Cunningham | B32B 5/245 |
| 2020/0344979 A1* | 11/2020 | Spanovic | A01K 13/006 |
| 2020/0375147 A1* | 12/2020 | Ohanian | A01K 27/002 |
| 2021/0121278 A1* | 4/2021 | Pierce | A01K 13/006 |
| 2022/0000598 A1* | 1/2022 | Thompson | A61D 9/00 |
| 2022/0117715 A1* | 4/2022 | Mills | A61D 9/00 |

OTHER PUBLICATIONS

"Embrace Relief System | Hip, Back, & Shoulder Therapy," Animal Ortho Care Website, Available Online at https://www.aocpet.com/collections/all/products/embrace-relief-system?variant=18181600510048, Retrieved Oct. 13, 2020, 4 pages.

* cited by examiner

SUPPORT DEVICE FOR QUADRUPEDS

CROSS-REFERENCE TO RELATED APPLICATION

This application claims benefit of U.S. Provisional Patent Application No. 62/927,069 filed Oct. 28, 2019 and entitled "Support Device for Quadrupeds." The entire contents of the above-referenced application is incorporated herein by reference.

BACKGROUND

Spinal injury and degeneration is very common in quadrupeds (e.g., canines or equines) due to a variety of causes such as genetics, erratic activity, disease, or accident. Degeneration and injury can cause pain, stiffness, muscle atrophy, and decreased mobility. Current therapies, such as corticosteroid shots, non-steroidal anti-inflammatory drugs (NSAIDS), and/or surgical intervention have limited effectiveness. In addition, corticosteriod shots and NSAIDS are not intended for long term use.

Existing quadruped orthotic devices generally support the lower quarter of quadruped extremities. However, such devices do not provide adequate support for spinal injury and degeneration. Furthermore, many of the current quadruped orthotic devices are made of neoprene which can cause allergic reactions and overheating, exacerbating existing issues and increasing the discomfort of an animal.

Existing braces, such as stifle braces, can provide support on either side of the quadruped's stifle joint. However, they do not provide the necessary support for spinal damage. In general, they are used to immobilize the joint and limit its motion. Vests for medial shoulder instability can be designed for temporary use during rehabilitation to limit movement. However, they can also trigger allergic reactions. Wheeled devices can limit a quadruped's activity due to their bulk. There is therefore a need for methods and devices for providing hind and spinal support in quadrupeds suffering from spinal injury or degenerative disease.

BRIEF SUMMARY

Various embodiments of a device and therapeutic method for providing support to quadrupeds with spinal injury or degeneration are presented. The device may replicate the support provided by normal musculature, thereby alleviating pain and discomfort and encouraging healing. In some example embodiments, a therapeutic method for compensating for spinal strength insufficiency in a quadruped may include wearing a compression garment to support the hind legs of the quadruped while distributing the weight of the hind quarters across the body of the animal, avoiding the creation of localized stress or strain points. The device may be, in one example embodiment, a single length of material with two sleeves for the hind legs, holes for anterior legs and a central length that wraps around the torso of the animal. In another example, the device may be a single tube of material or a single length of material with two sleeves that fits over each hind leg and wraps around the lower back of the animal, above the hind legs. In alternate embodiments, the central length that wraps around the torso, may be a central vest separate from a single length of material with two sleeves or a single tube of material for the front or hind legs. Such an embodiment allows for compression to be applied to varying parts of the body as needed. For example, compression may be applied only in the central region, when only the vest is worn, or only to the hind legs, when the sleeve is worn over the quadruped's hind legs. In still further examples, in addition to the anterior holes, the central "vest" may have posterior holes through which the single long sleeve can be threaded and positioned, allowing for the sleeve to be coupled to the central vest. In such an embodiment, compression can be provided in the central region and the hind legs, and the weaving of the sleeve through the holes of the central vest allows for correct positioning of the compression on the legs as well as appropriate distribution of body weight. Further still, the vest and sleeve may be integrated into a single garment that provides uniform or variable compression to the quadruped. In some aspects, the sleeve may be attached to the outside of the vest. In other aspects, the sleeve may be threaded through the vest. For example, the sleeve may be attached to the underside of the posterior of the vest. The sleeves and central "vest" may be made of the same or different materials with the same or different amounts of compression. In some aspects, the central "vest" may be made of non-compressive material and used to assist in placement and retention of the compressive material for the front or hind legs.

In some examples, the compression garment is made of a compression material that contains variable compression zones applying light, moderate and high pressure along specific areas of the quadruped. Light compression is defined as between 10 to 15 mmHg of pressure, moderate compression is between 15 to 20 mmHg of pressure, and high pressure is greater than 20 mmHg, generally between 20 to 30 mmHg of pressure. In some embodiments, a moderate compression zone applies between 10% to 50% less compression as compared to the compression applied by a high compression zone.

In other examples, the compression garment is made of a compression material that has a uniform compression throughout. As a result, the same level of compression is applied to all regions of the quadruped in contact with the compression garment. For example, uniform compression may be applied to the hind legs, from a hip region to a stifle, hock, ankle joint, or metatarsal region. Based on the nature of the garment material, the compression applied may be uniformly light, medium, or high.

The sleeves of the compression garment generally apply substantially circumferential compression to the leg of a quadruped. In some embodiments, the longitudinally anterior and posterior halves of the sleeve (where the anterior half runs the length of the leg from the hip to the ankle and covers the patella) may have differing amounts of compression in all or in part. In other embodiments, the circumferential compression applied on the leg is uniform.

In some embodiments, a compression garment for a quadruped may include a first moderate compression zone adapted for applying substantially circumferential compression to a hind metatarsus of the quadruped, a first light compression zone adapted for applying substantially circumferential compression from the hind metatarsus to a stifle joint, a first high compression zone adapted for applying compression at the back of the stifle joint and a second light compression zone over a patella, a third light compression zone adapted for applying substantially circumferential compression to a hind tibia and fibula, a fourth moderate compression zone adapted for applying substantially circumferential compression at a knee, and a fourth light compression zone adapted for applying substantially circumferential compression above the knee and adjacent to the fourth medium compression zone.

In other embodiments, a compression garment for a quadruped may include a central vest. The central vest may be made of a compression material for applying substantially circumferential compression over a torso of a quadruped. Alternatively, the central vest, when coupled to a compression sleeve, may be adapted to redistribute weight from the hind legs to more widely over the torso. The garment may further include a compression sleeve, symmetric about a central point, the sleeve having a first end for applying substantially circumferential compression over a first hind leg, and a second end, opposite the first end, for applying substantially circumferential compression over a second hind leg of the quadruped. The vest may include a first pair of anterior holes for receiving anterior legs of the quadruped. The vest may further include a second pair of posterior holes for receiving the compression sleeve threaded there-through such that the first end and the second end are configured on opposite ends of the central vest.

The compression garment may use any type of material, new or recycled, that can be constructed to provide variable or uniform levels of compression. Compression may be varied within the garment, for example, by yarn type and size, characteristics of stretch yarns utilized, variable weft, warp, and fabric structure, such as stitch size. Along with different fiber blends, different fabric construction methods can be used such as weaving and knitting. The compression material can also be manufactured to have a range of elongation, modulus and breathability characteristics, depending on the fiber component composition used or chemical treatment to the fabric during finishing. In some embodiments, the compression material may be a spandex or elastane blend.

In some embodiments, the compression garment is made of a continuous length of compression material incorporating variable or uniform amounts of compression throughout the length. The compression may be exerted in a multi-planar fashion allowing for continued support during movement. These and additional features and advantages of the device and therapeutic method will be better understood in view of the detailed description provided below.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Described herein are systems and methods for providing support to quadrupeds such as equines or canines, or other mammals having four feet, with spinal injury or degeneration. Such systems and methods may be therapeutic, that is the systems and methods provide treatment for diseases or disorders of four-footed mammals.

Figure 11:
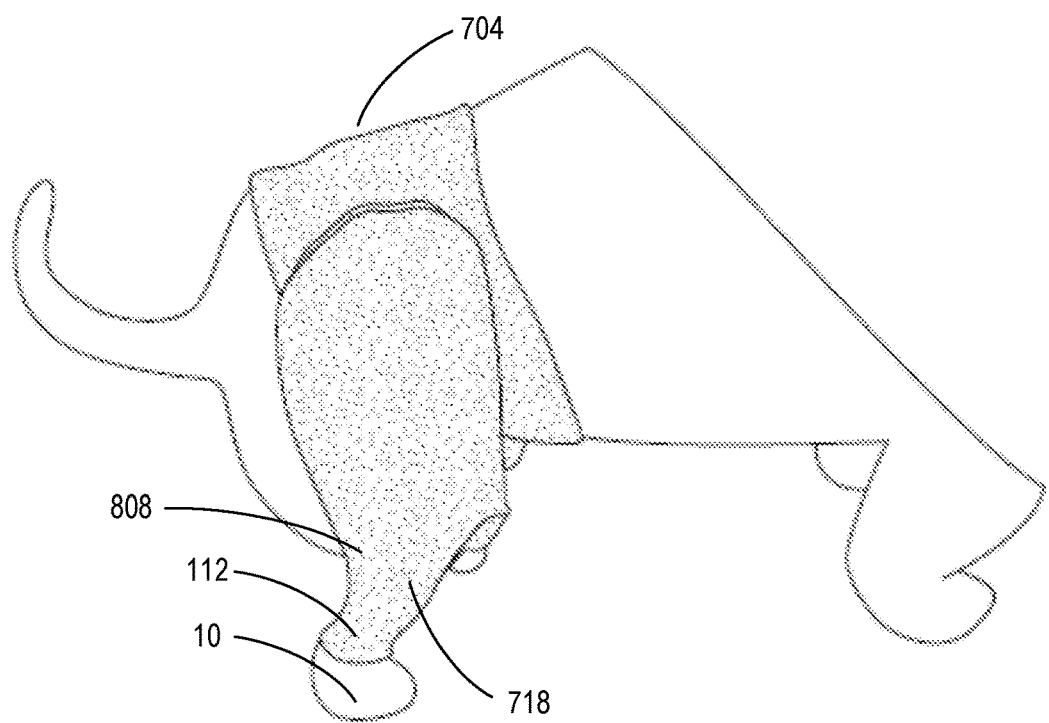
FIG. 11 illustrates a side view of a continuous material compression garment in accordance with the third example embodiment.
Figure 12:
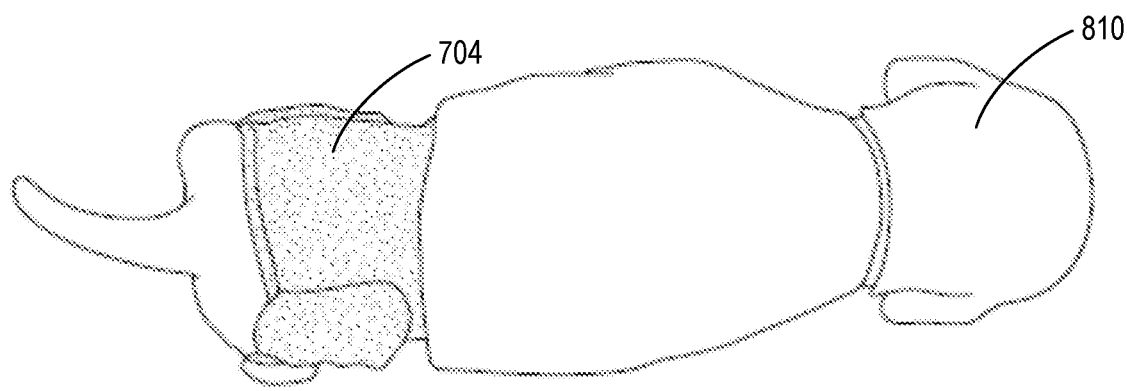
FIG. 12 illustrates a top view of a continuous material compression garment in accordance with the third example embodiment.
Figure 13:
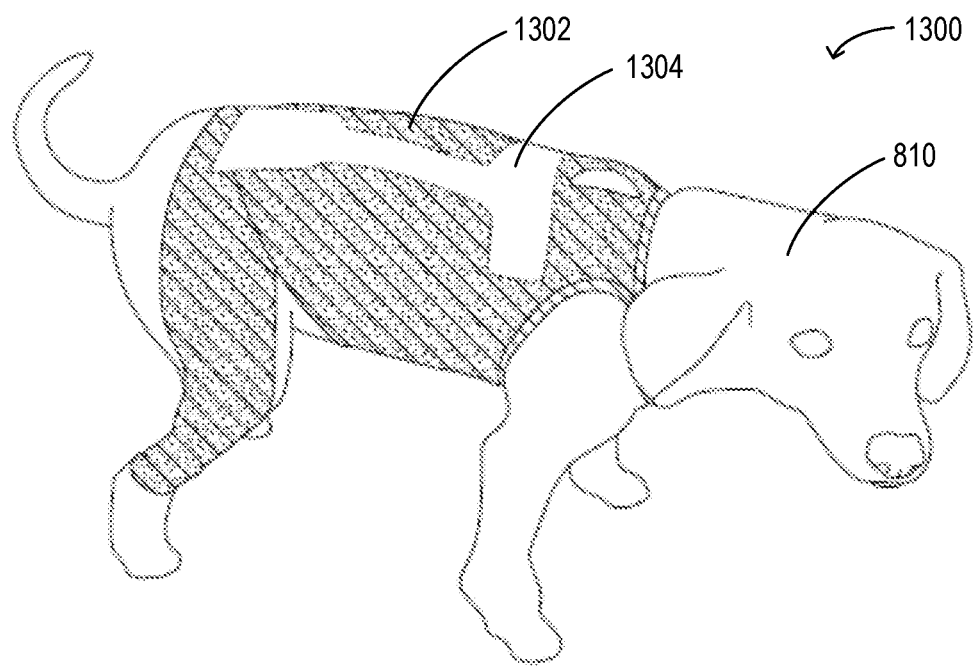
FIG. 13 illustrates a fourth example embodiment of a continuous material compression garment.
Figure 14:
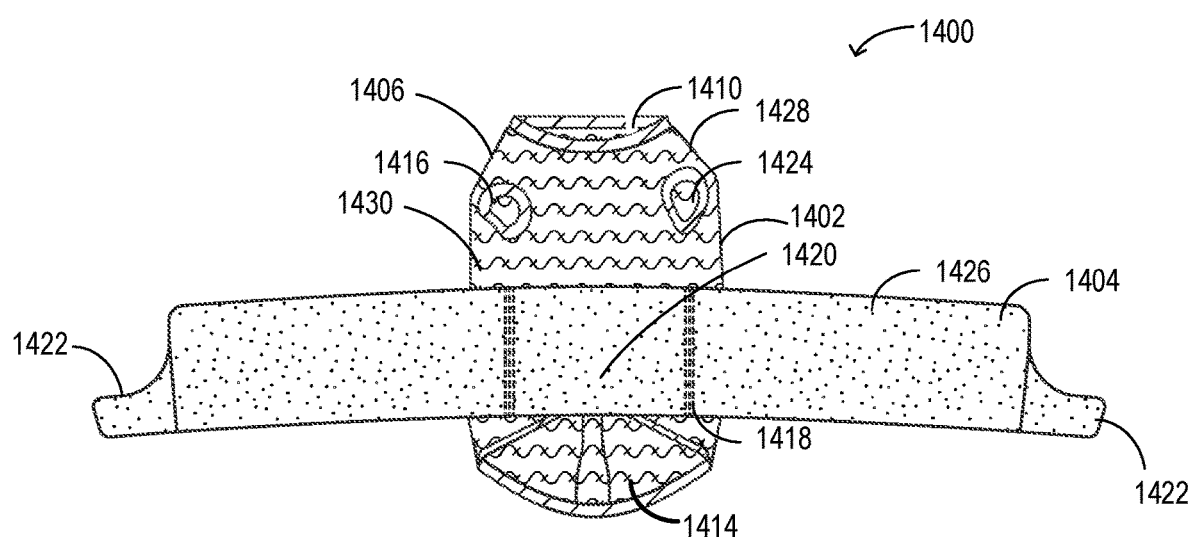
FIG. 14 illustrates a fifth example embodiment of a compression garment.
Figure 15:
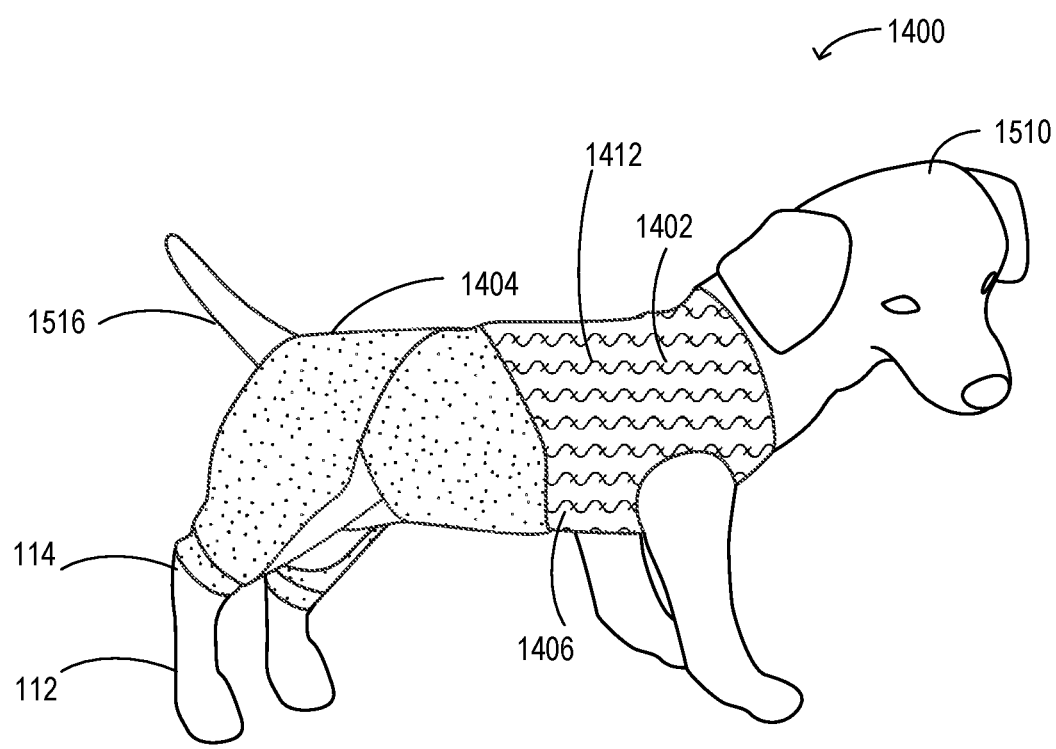
FIG. 15 illustrates a side view of the compression garment in accordance with the fifth example.
Figure 16:
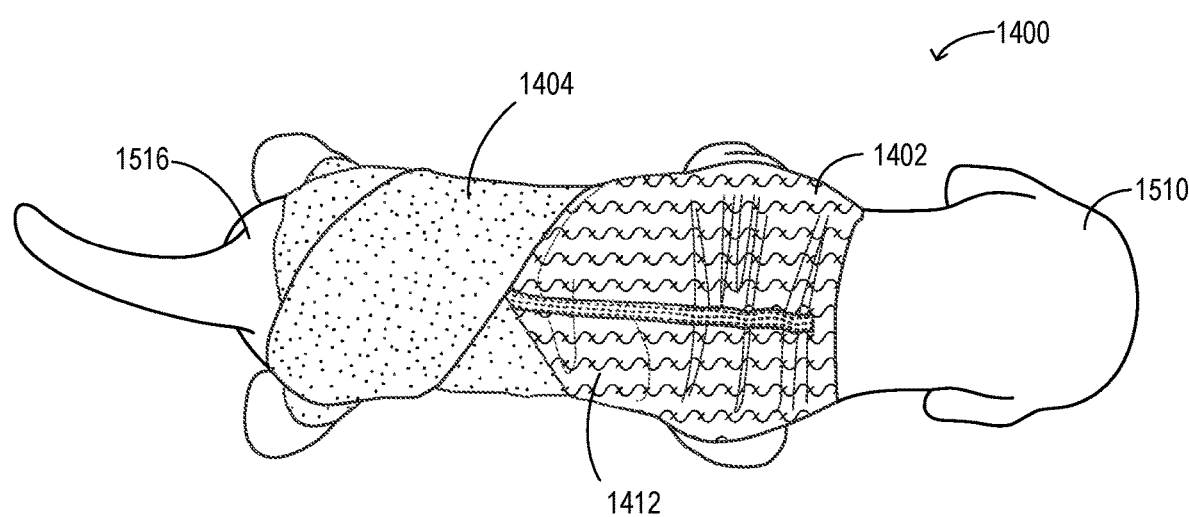
FIG. 16 illustrates a top view of the compression garment in accordance with the fifth example.

FIGS. 1-6 disclose a variable pressure compression garment with integrated hind leg compression sleeves for support of the hind quarters of quadrupeds suffering from spinal injury or degradation. FIGS. 7-12 disclose a modular compression garment with hind leg compression sleeves that are detachably joinable to a central vest. Such compression sleeves may be used alone or in combination with the central vest. FIG. 13 discloses an integrated compression garment with hind leg compression sleeves integrated with a central vest to provide uniform compression throughout the quadruped's back, torso region, and hind legs. FIGS. 14-16 disclose a modular compression garment with hind leg compression sleeves that are attached to the exterior of a central vest. The depicted example embodiments of the garment provide stability to the hindquarters and spine of a quadruped and distribute weight across the body of the quadruped avoiding strain on localized points of the body. Specifically, the compression garment provides multi-planar support mimicking the natural musculature of the quadruped.

Utilization of the compression garment assists in preventing additional damage and decreasing pain and discomfort while allowing for full range of motion and normal ambulation. Early utilization of the garment in quadrupeds with spinal injury decreases the development of scar tissue from the injury and may shorten the time needed for recovery.

The multi-planar knit is oriented in accordance with the direction of the muscle fibers found in areas of stress of a quadruped with spinal degeneration or injury. The compression garment of FIGS. 1-6 comprises a compression material with a plurality of compression zones with different amounts of compression. The compression garment of FIGS. 7-16 comprises a garment in which the compression portion of the garment has compression zones of uniform amounts of compression. In some embodiments, the compression garment may mimic the superficial pectoral muscles. In one embodiment, the compression garment provides two compression sleeves for the hind legs of the animal which are attached to and/or part of a length of compression material that wraps around the torso of the animal with holes for the forelegs. In some embodiments, the compression sleeves may cover the upper part of the quadruped's legs. In other embodiments, the compression sleeves may cover the length of the quadruped's leg, contoured from the hips to the hock and stifle of the hind leg. The compression garment may further be wrapped around the torso of the animal so that it distributes the supported weight. In some embodiments, the length of the compression material may be wrapped around the torso of the animal a plurality of times allowing for fit adjustment depending on the size of the animal.

The compression sleeves may provide the same or different amounts of compression around the leg of the quadruped. Different portions of the compression garment may independently provide the same or different amounts of compression from the compression around the leg of the quadruped throughout the torso of the quadruped. In some embodiments, a higher circumferential compressive force may be located in the posterior extremity portion of the garment while a combination of high and moderate compressive force may be incorporated into the portion of the garment covering the chest of the quadruped. For example, a higher compressive force may be located on the sacroiliac joints with lower levels of compression throughout the remaining portion of the garment surrounding the torso of the quadruped.

In some embodiments, the sleeves of the compression garment may provide a moderate level of circumferential compression at a band just below the hock on the metatarsus, a low level of circumferential compression from above the hock to the stifle increasing to a moderate level of circumferential compression over the stifle and a graduated area of decreasing compression from above the stifle to the top of the thigh of the quadruped. In additional embodiments, there may be an area of high circumferential compression near the top of the thigh with a moderate level of circumferential compression at the junction between the thigh and the body. In other embodiments, the sleeves of the compression garment may provide equal compression between the joints of the quadruped with less compression over the stifle. In further embodiments, the compression garment may apply high levels of compression to the rear of the stifle and a light level of compression over the patella. The transition from one level of compression to another may be independently gradated or abrupt. In still other embodiments, the sleeves of the compression garment may provide equal compression throughout the leg, from the hip to the metatarsal region.

In further embodiments, there may be an area of compression in the portion of the compression garment surrounding the anterior thoracic girdle. There may additionally be anterior extremity holes in the thoracic girdle portion of the compression garment to allow for each anterior extremity to pull through, anchoring the coronal plane. In some embodiments, there may be a higher level of compression edging the anterior extremity holes with the amount of compression gradually decreasing as the garment moves up across the chest of the quadruped. In further embodiments, the amount of compression across the chest of the quadruped may be a combination of medium and high compression. In additional embodiments, the compression garment may have an edging along the exterior sides of its length with a higher level of compression than the compression material between the edgings. In further embodiments, the compression at the top of the legs (anterior extremity holes and upper edging of posterior sleeves) may be a moderate or medium level of compression. In some embodiments, there may be alternating levels of compression across the chest of the quadruped radiating out from the anterior extremity holes. In one embodiment, these alternating levels of compression may be medium and high compression areas.

The garment may wrap around the thoracic area of a quadruped evenly distributing the supported weight of the hindquarters. In some embodiments, the portion of the garment wrapped around the thoracic area of the quadruped may comprise a central high compression area with adjacent moderate compression areas on either side of the high compression area. There may additionally be light compression areas on the exterior side of the moderate compression areas (such that the portion of the garment encircling the thoracic area, may, starting along the outer longitudinal area of the garment wrapping around the thoracic area, have a sequentially ordered light compression area, moderate compression area, high compression area, moderate compression area and a light compression area where each area is adjacent to the area listed as preceding and following it). In some embodiments, the compression garment may comprise a continuous knit continuing from the compression sleeves to rest on the dorsal aspect of the hip to seamlessly continue to a flat band of varying compression material of a generally elongated, rectangular shape that can wrap around the torso of the quadruped. In some embodiments, the width and length of the continuous knit may depend on the size of the animal. In other embodiments, it may be one-size fits all. In this instance, adjacent refers to a fabric zone located or formed beside or surrounded, in whole or in part, by another fabric without intervening fabric, parts or other structure.

In further embodiments, the portion of the garment wrapped around the thoracic area (or torso) of the quadruped may comprise a single vest element having a pair of anterior extremity holes for receiving the anterior legs of the quadruped. Upon receiving the anterior legs, the vest is correctly positioned over the thoracic region or torso of the quadruped. In some examples, the vest is a high compression vest for applying and redistributing pressure circumferentially over the thoracic region. The vest may further include a pair of posterior extremity holes or slits through which the single compression sleeve is threaded. After threading the compression sleeve through the two slits, such that each end of the compression sleeve is symmetrically positioned over the hip region, posterior legs of the quadruped are received in the compression sleeve. The vest thereby redistributes the weight from the hind legs to the rest of the body. In some embodiments, the compression garment may comprise a continuous knit continuing from the compression sleeves to rest on the dorsal aspect of the hip to seamlessly continue to a flat band of uniform compression material of a generally elongated, rectangular shape that can wrap around the torso of the quadruped. In still further embodiments, the vest and compression sleeve may be integrated into a single garment applying uniform compression over the quadruped's body.

While the garment may be fastened by any means known to those of skill in the art including, but not limited to, ties, pins, hook and loop systems, hook and eye systems, buttons, snaps, interlocking shapes, buckles, adhesive tapes, cohesive surfaces, zippers, and other connectors, in some embodiments, the garment may be fastened by threading the ends of the garment through slits located proximate to the middle of the portion of the garment located on the top of the quadruped, allowing for adjustment of the size of the garment depending on the girth of the animal.

The compression garment may use any type of material that can be constructed to provide variable levels of compression. Such materials include fabrics that provide variable compression of between about 10 mmHg and about 40 mm/Hg, wherein about indicates +/−10%.

Compression may be varied, for example by yarn type and size, characteristics of yarns utilized, warp, weft, and fabric structure, such as stitch size. Along with different fiber blends, different fabric construction methods can be used such as weaving and knitting. The elasticity (stretch) and the modulus (compressive power or force, e.g. ratio of tensile stress to tensile strain) are different in the two orientations of the fabric: warp or length direction (generally attached to a loom before weaving begins) and the width or weft direction (generally woven in front of and behind the warp). Elasticity of a fabric may be determined where X=the original width; Y=the width after stretching −X; and (Y/X)*100=stretch percentage. In some embodiments the amount of elasticity in the compression garment may be between about 100-180% for the warp and 70-140% for the weft. In some embodiments, the material construction may provide 200% length× 200% width stretch with power and modulus results in both directions. Such elasticity and modulus depend on the type of fibers used in construction of the fabric. In other examples, the fabric has the same level of compression throughout its length and width.

In some embodiments, the compression garment may be manufactured using elastane (spandex). Spandex is a complex, synthetic, elastomeric material with stretch up to 500-600% and may be blended with many other types of fibers such as polyesters, cottons, nylons and others commercially available. Generally, in some embodiments, the compression garment may comprise approximately 76% 140 denier micro-nylon and 24% 280 denier LYCRA spandex. In further embodiments, the amount of compression in each portion of the compression garment may be adjustable. In some embodiments, the compression material may comprise the compression fabric described in U.S. Pat. No. 9,204,986, with different high, moderate and low compression points. For example, it may be formed of a closed-loop jersey-knit body yarn comprising micro-nylon, moisture wicking fibers, and/or other natural or synthetic fibers and blends.

The compression material can be manufactured to have a range of elongation, modulus and breathability characteristics, depending on the fiber component composition used or chemical treatment to the fabric during finishing. Such treatments are known to those of skill in in the art.

The compression garment described herein may be more fully understood with reference to the accompanying drawings which show one or more exemplary embodiments. The compression garment, however, should not be construed as limited to the embodiments set forth herein as these embodiments are illustrative.

Figure 1:
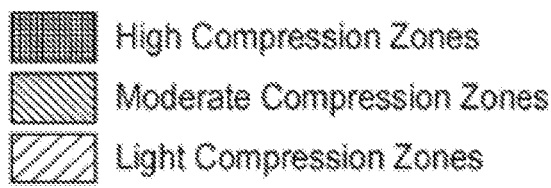
FIG. 1 illustrates a first example embodiment of a completed alignment of a quadruped compression garment.
Figure 1:
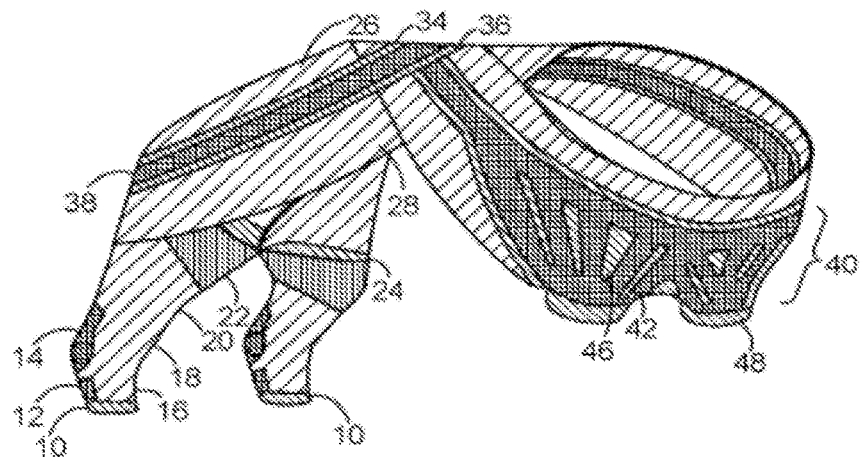
Figure 2:
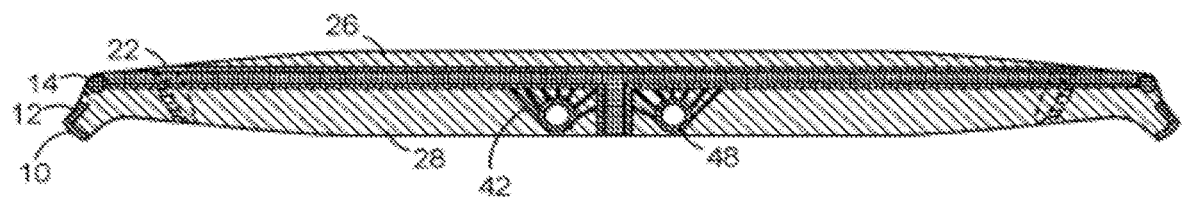
FIG. 2 illustrates a top side of a continuous material compression garment in accordance with the first example embodiment.
Figure 3:
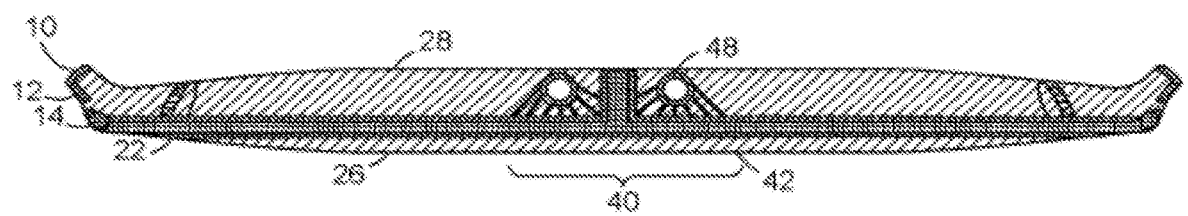
FIG. 3 illustrates an underside of a continuous material compression garment in accordance with the first example embodiment.
Figure 4:
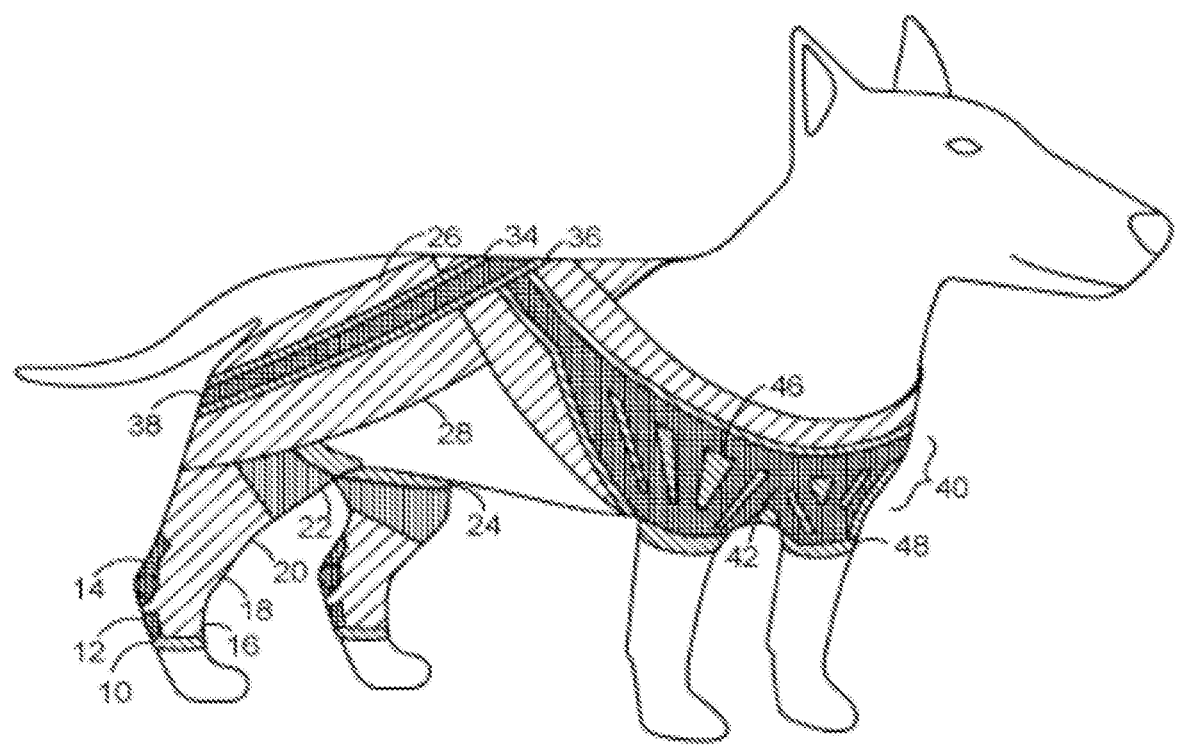
FIG. 4 illustrates a side view of a quadruped orthotic device in accordance with the first example embodiment on a canine.
Figure 5:
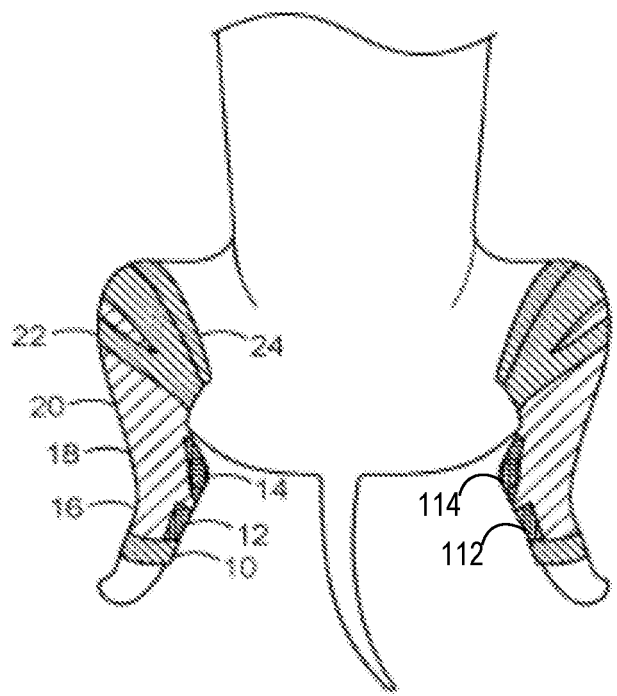
FIG. 5 illustrates a ventral view of a compression garment in accordance with the first example embodiment on a canine.
Figure 6:
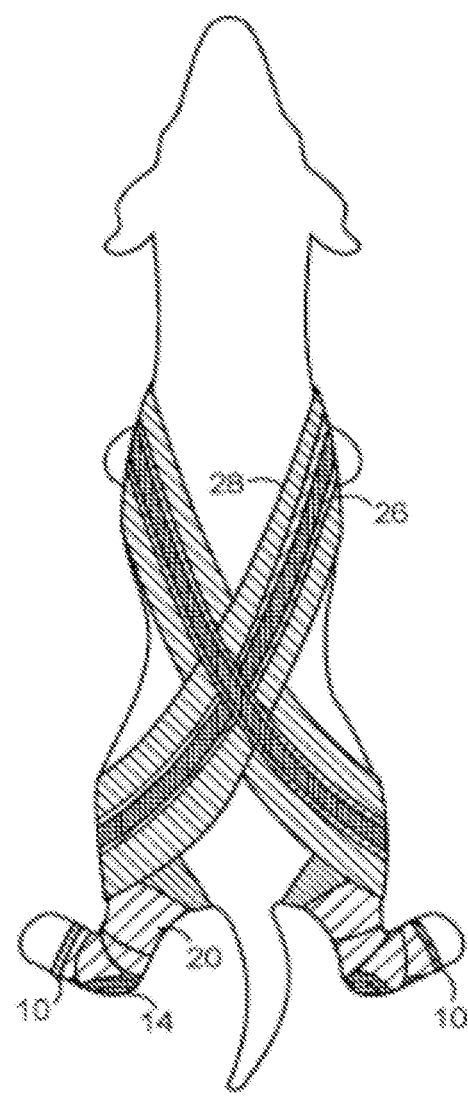
FIG. 6 is a dorsal view of an orthotic device in accordance with the first example embodiment on a canine.

FIG. 1 shows a first example embodiment of a wrapped compression garment without a quadruped. FIG. 2 provides a top view of an embodiment of the unwrapped compression garment. FIG. 3 provides an underside view of an embodiment of the unwrapped compression garment. FIG. 4 provides a side view of an embodiment of a compression garment on a quadruped from the side. FIG. 5 provides a ventral view of a canine wearing an embodiment of the compression garment. FIG. 6 provides a dorsal view of an embodiment of a canine wearing an embodiment of a compression garment. FIGS. 1-6 pertain to the same embodiment.

Referring to the figures, a first moderate compression zone 10 is adapted for applying substantially circumferential compression to a hind metatarsus of the quadruped. In some embodiments the compression zones comprise elastic yarns integrated with a body yarn. While any suitable compression fabric may be used, in some embodiments the compression fabric may incorporate an elastomeric material such as spandex with another fiber such as nylon. In some embodiments, the compression garment may be made of breathable material. A third high compression zone 12 is located over the rear metatarsal area while a first high compression zone 14 is placed over the hock to provide support to the Achilles tendon. These areas of high compression are balanced with a light compression zone providing substantially circumferential compression between the rear metatarsal area 112 and hock 114, first light compression zone 16 in front of the hock, second light compression zone 18 over the patella and a third light compression zone 20 applying substantially circumferential compression at the top of the thigh. The anterior portion of the compression garment applies second light compression 18 over the patella and a first light compression area 16, allowing for extension and flexion of the hind leg. A band 24 of fourth light compression above the knee applying substantially circumferential compression while allowing for freedom of movement. The compression garment continues across the top of the quadruped with a fourth zone of light compression 26 and 28 on the exterior sides of the compression garment covering the hips of the quadruped and continuing across the back. The amount of compression increases towards the middle of the garment across the hips and body, progressing from the fifth zones of light compression 26 (upper) and 28 (lower) to second moderate compression zones at 34 (upper) and 36 (lower) and a central fourth zone of high compression 38. The fifth zones of light compression 26 and 28, second moderate compression zones 34 and 36 and central fourth zone of high compression 38 continue along the back of the quadruped until reaching the chest 40 of the quadruped. The chest comprises a fifth zone of high compression 42 interspersed with third moderate compression zones 46 interspersed through the fifth zone of high compression 42. Fifth zone of high compression 42 interspersed with the third moderate compression zone 46 radiates upwards from a band 48 of moderate compression surrounding the top of the anterior legs of the quadruped, the band allowing the anterior legs to poke through the compression garment, assisting in keeping the compression garment in place while allowing full range of motion for the anterior legs. The second moderate compression zones 34 and 36 continue along either side of the fifth zone of high compression 42 interspersed with the third moderate compression zone 46. The second moderate compression zones 34 (upper) and 36 (lower) continue along the exterior of the fifth zone of high compression 42, with the upper fifth zone of light compression 26 continuing across the chest along the second moderate compression zone 34 with the lower fourth light compression zone 28 re-joining the exterior for the lower second moderate compression zone 36 to continue the wrap across the back of the quadruped.

Targeted compression in the various circumferential zones of the compression garment may be graduated by integrating elastic yarns of strategic lengths with the body yarn in the different axially divided garment regions. The amount of compression may be altered by increasing the length of the elastic yarns. Low compression areas may be between 10-15 mmHg. Moderate compression zones may be between 15-20 mmHg. High compression zones may be greater than 20 mmHg. In some embodiments, high compression zones may be between 20 and 30 mmHg.

As shown in FIGS. 4-6, varying circumferential compression against the hind legs and body can be achieved at different parts of the compression garment. The compression is consistent with the shape of the legs and body so that it compresses the venous system, decreasing swelling in the lower extremities. It follows the natural musculature of the quadruped, providing appropriate support to quadrupeds with spinal degeneration or injury.

Further structural support is provided by the lift created by concentrated high compression along the Achilles tendon at 12 and 14, and a fourth zone of moderate support across the knees 22. The cooperating levels of compression are sufficient to provide lift and support, but not create restriction and discomfort to the wearer.

Figure 7:
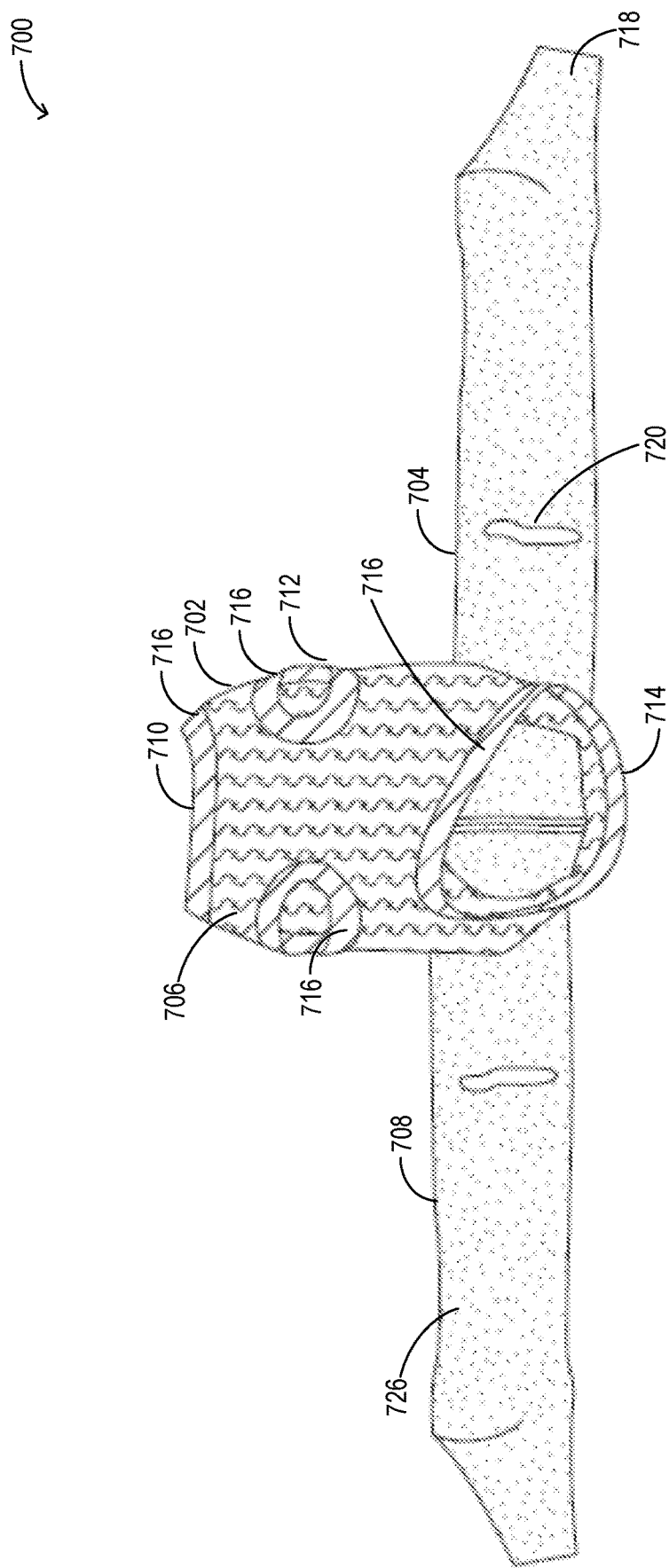
FIG. 7 illustrates a second example embodiment of a completed alignment of a quadruped compression garment.
Figure 8:
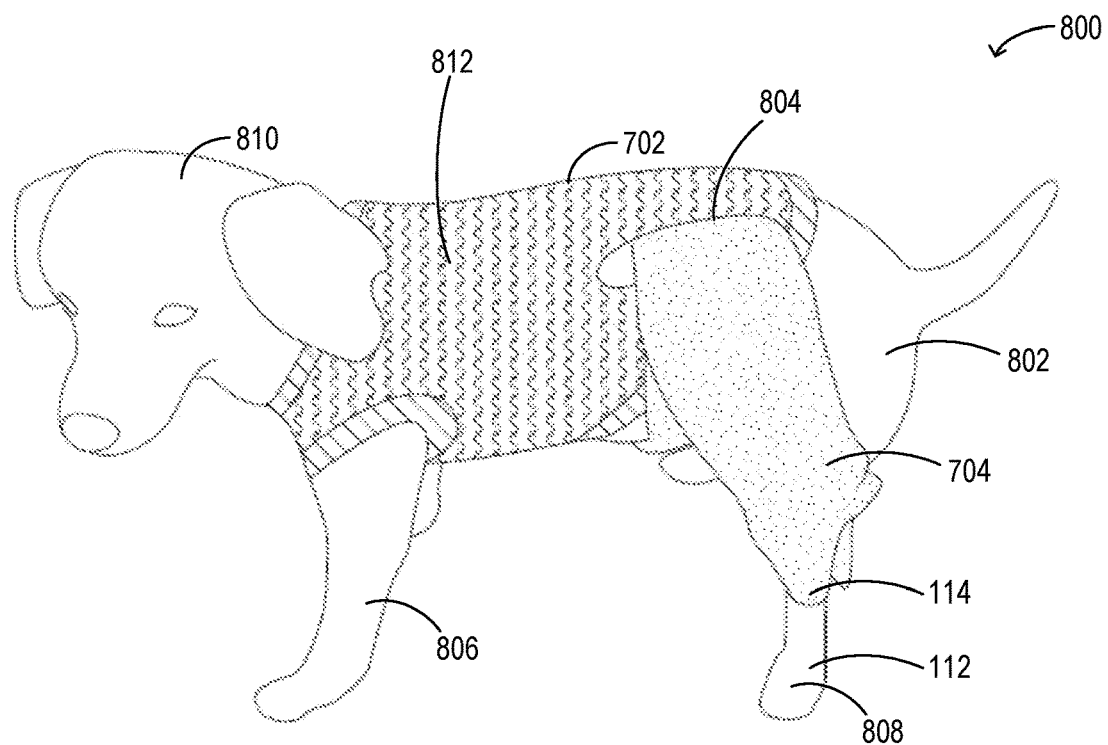
FIG. 8 illustrates a side view of a continuous material compression garment in accordance with the second example embodiment.
Figure 9:
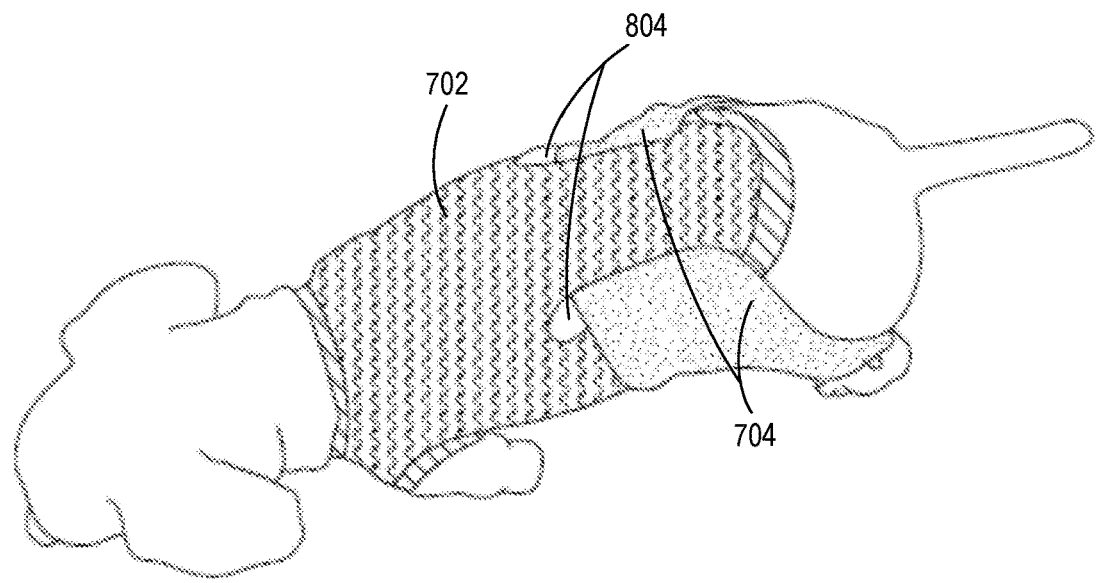
FIG. 9 illustrates a top view of the continuous material compression garment in accordance with the second example embodiment.

FIGS. 7-9 shows a second example embodiment 700 of a compression garment for a quadruped. FIG. 7 shows the garment by itself, laid out. FIGS. 8-9 show side and top views of the garment when worn by a quadruped 810. In the depicted example, the quadruped is a canine. The description below refers to any or all of FIGS. 7-9.

The garment 700 includes a central vest 702 coupled to a compression sleeve 704. The embodiment is a modular embodiment with the central vest and compression sleeve provided as separate units that can be coupled to each other or worn separately. When coupled, the compression sleeve 704 provides circumferential compression on hind legs of a quadruped, while the vest redistributes the weight from the hind legs to a thoracic region (or torso) 812 of the quadruped's body, thereby relieving weight and stress from the spinal region. In particular, the compression sleeve covers and applies compression to the rear metatarsal region 112, and hock 114.

Central vest 702 is configured substantially cylindrically with a primary anterior opening 710 through which an anterior region of the quadruped (including head) is exposed when the vest is worn, and a primary posterior opening 714 though which a posterior region 802 of the quadruped (including rump, loin, and tail) is exposed. Further, a pair of smaller anterior openings 712 are provided for receiving the anterior legs. The pair of openings are symmetrically positioned along a central longitudinal axis of the vest, and closer to the anterior opening 710 than the posterior opening 714.

The vest, and corresponding openings, may be designed in pre-defined sizes matching predefined sizes of the quadruped, such as small, medium, and large. Alternatively, the vest may be configured with an underbody (ventral side) strap which allows the vest to be fitted to the size of the quadruped's central body form. Each opening may be lined via a cuff 716 to provide comfort when the vest is worn, and to reduce the likelihood of allergic reactions. The cuff 716 may be made of a different material than both the central vest and the compression sleeve.

The central vest may be made of a compression material 706 (curved hatching), as described earlier with reference to the first embodiment of FIGS. 1-6. Alternatively, the central vest may be made of nylon or other non-compressive materials. When made of compression material, the material may be of variable compression, including distinct compression zones of varying pressure (such as any combination of zones of light, medium, and high compression). Alternatively, the central vest may be made of a material of uniform compression (which may be light, medium, or high compression throughout).

The central vest 702 includes two dorsal slits or openings 804 (FIGS. 8-9) through which the compression sleeve 704 is threaded. Upon threading, each end 718 of the compression sleeve is positioned on either side of a longitudinal axis of the vest, and the quadruped 810. The ends 718 may be tapered and contoured such that they fit the hock and ankle region of the quadruped. In alternate examples, the ends may have a fastening element, such as buttons, hook-and-loop fasteners, etc., via which the end may be fastened with a desired degree of tightness around the quadruped's ankle. Opening 722 in the compression sleeve allows a hind leg of the quadruped, which is to be compressed, to be inserted into the corresponding end of the compression sleeve 704. The fit of the compression sleeve may be adjusted through the use of opening 720 which allows for one end 718 to be inserted to wrap the compression sleeve around the hind quarters of the quadruped, adjusting the fit to the girth of the animal.

In one example, the compression sleeve 704 is made of a material 726 (dotted pattern) having high compression while the vest is made of a material 706 having lower compression (such as no compression). As such, the compression vest 702 and compression sleeve 704 of FIGS. 7-9 may be used together as a modular garment. In other examples, they may be used separately.

Figure 10:
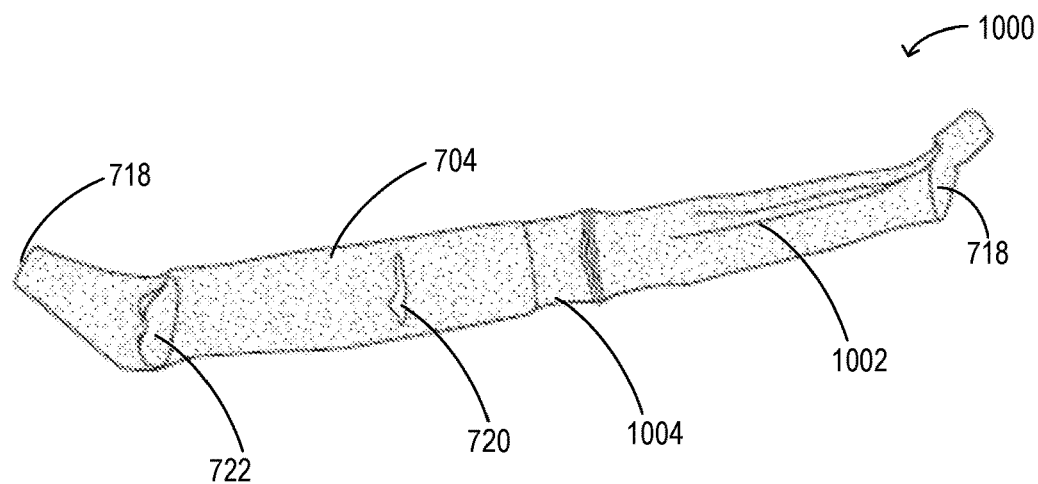
FIG. 10 illustrates a third example embodiment of a completed alignment of a quadruped compression garment.

FIG. 10 shows an example embodiment 1000 wherein only the compression sleeve 702 is used. In the depicted embodiment, a first end 718 is configured tapered while another end 718 is configured with a fastening element 1002, such as Velcro. A length 1004 of the compression sleeve between the ends 718 may be configured based on the size of the quadruped (e.g., small, medium, large, etc.). In particular, a first hind leg of the quadruped is inserted into the tapered end of the compression sleeve. Then, the remainder of the compression sleeve is wrapped over the hind region of the animal, one or more times around. After wrapping the other remaining end 718 of the compression sleeve is inserted through opening 720, the remaining hind leg is inserted into the remaining sleeve and fastened via the fastening mechanism. In this embodiment, compression is selectively applied to the hock region 808. An example of a canine wearing only the compression sleeve is shown at FIGS. 11-12. In these examples, the compression sleeve can be worn without the need for the vest.

In still another further example embodiment 1300, shown at FIG. 13, the compression sleeve and vest are integrated into a single garment 1302 made of a uniform compression material. In this embodiment, the same degree of pressure is applied through the torso and hind region of the animal while the integrated garment allows the body weight to be distributed away from the spinal region.

An optional handle 1304 may be sewn into the garment, on the top surface, substantially on a dorsal side of the animal when the garment is worn. The handle allows a human working with the quadruped to further relieve pressure from the animal's spinal region. Alternatively, the handle may be used to lift the animal. When included, the handle may be made of a material that is not compressive.

FIGS. 14-16 show a fourth example embodiment 1400 of a compression garment for a quadruped. FIG. 14 shows the garment by itself, laid out. FIGS. 15-16 show side and top views respectively of the garment 1400 when worn by a quadruped. In the depicted example, the quadruped is a canine though the garment could be worn by any four-legged animal. The description below refers to any or all of FIGS. 14-16.

The garment 1400 includes a central vest 1402 coupled to a compression sleeve 1404. In this embodiment, the compression sleeve 1404 is attached to the underside 1430 of the posterior of the vest 1404. The compression sleeve 1404 provides circumferential compression on hind legs of a quadruped, while the vest redistributes the weight from the hind legs to a thoracic region (or torso) 1412 of the quadruped's body, thereby relieving weight and stress from the spinal region. In particular, the compression sleeve covers and applies compression along the leg to below the knee cap. In some embodiments, the compression sleeve may extend to cover the rear metatarsal region 112 and hock 114. Attaching the compression sleeve 1404 to the underside of the vest 1402 allows for the compression sleeve to be wrapped around the torso 1412 in a cantilevered manner as shown in FIG. 15. In some embodiments, this relieves the pressure from the lumbar spine. This configuration may also compress and pull the hips of the quadruped inwards, providing additional support.

Central vest 1402 is configured substantially cylindrically with a primary anterior opening 1410 through which an anterior region of the quadruped (including head) is exposed when the vest is worn, and a primary posterior opening 1414 though which a posterior region 1516 of the quadruped (including loin, and tail) is exposed. Further, a pair of smaller anterior openings 1424 are provided for receiving the anterior legs. The pair of openings are symmetrically positioned along a central longitudinal axis of the vest, and closer to the anterior opening 1410 than the posterior opening 1414.

The vest, and corresponding openings, may be designed in pre-defined sizes matching predefined sizes of the quadruped, such as small, medium, and large. Alternatively, the vest may be configured with an underbody (ventral side) strap which allows the vest to be fitted to the size of the quadruped's central body form. Each opening may be lined via a cuff 1416 to provide comfort when the vest is worn, and to reduce the likelihood of allergic reactions. The cuff 1416 may be made of a different material than both the central vest and the compression sleeve.

The central vest may be made of a compression material 1406 (curved hatching), as described earlier with reference to the first embodiment of FIGS. 1-6. Alternatively, the central vest may be made of nylon or other non-compressive materials. In one example, the compression sleeve 1404 is made of a material 1426 (dotted pattern) having high compression while the vest is made of a material 1428 (wavy pattern) having lower compression (such as no compression).

When made of compression material, the material may be of variable compression, including distinct compression zones of varying pressure (such as any combination of zones of light, medium, and high compression). Alternatively, the central vest may be made of a material of uniform compression (which may be light, medium, or high compression throughout).

The compression sleeve 1404 is attached at 1418 to the central vest 1402. That is, the compression sleeve 1404 is attached to the underside of the posterior end of the central vest 1402. In some aspects, the compression sleeve 1404 may be attached so as to form a pouch 1420 into which hot or cold packs or other therapeutic agents may be placed. Each end 1422 of the compression sleeve is positioned on either side of a longitudinal axis of the vest, and the quadruped 1510. The ends 1422 may be tapered and contoured such that they fit the hock and ankle region of the quadruped. In alternate examples, the ends may have a fastening element, such as buttons, hook-and-loop fasteners, etc., via which the end may be fastened with a desired degree of tightness around the quadruped's ankle. As in FIG. 10, an opening (not shown in FIG. 14) such as 722 in the compression sleeve allows a hind leg of the quadruped, which is to be compressed, to be inserted into the corresponding end of the compression sleeve 1422. The fit of the compression sleeve may be adjusted through the use of an opening comparable to opening 720 in FIG. 7 which allows for one end 1422 to be inserted to wrap the compression sleeve around the hind quarters of the quadruped, adjusting the fit to the girth of the animal. The wrapped compression sleeve may be angled as shown in FIGS. 15 and 16, removing stress from the lumbar spine and in some aspects compressing the hips of the quadruped to provide additional support.

The foregoing description of the exemplary embodiments has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternately embodiments will become apparent to those skilled in the art to which the present invention pertains without departing from its spirit and scope. Accordingly, the scope of the present invention is defined by the appended claims rather than the foregoing description and the exemplary embodiments described therein.

With the foregoing in mind, the following claims are intended to define the scope of protection to be afforded the inventor, and the claims shall be deemed to include equivalent constructions insofar as they do not depart from the spirit and scope of the present invention. A plurality of the following claims express certain elements as a means for performing a specific function, at times without the recital of structure or material. As the law demands, these claims shall be construed to cover not only the corresponding structure and material expressly described in the specification but also equivalents thereof.

The invention claimed is:

1. A compression garment for a quadruped, comprising: a compression vest adapted to be wrapped around a torso of the quadruped, the compression vest including anterior openings for receiving fore legs of the quadruped and a posterior dorsal opening for receiving a compression sleeve, wherein the compression sleeve is configured to be threaded through the posterior dorsal opening;

the compression sleeve having a pair of terminal openings for receiving hind legs of the quadruped, and the compression sleeve applying annular compression on the hind legs.

2. The compression garment of claim 1, wherein the compression vest and the compression sleeve are made of different materials.

3. The compression garment of claim 1, wherein a compression material of one or more of the compression vest and/or the compression sleeve provides independently distributed compression to limbs and the torso of the quadruped in continuous or non-continuous sections of the compression vest or the compression sleeve.

4. The compression garment of claim 1, wherein the compression vest provides a first compression and the compression sleeve provides a second compression, and wherein the first compression and the second compression are different.

5. The compression garment of claim 4, wherein the second compression is greater than the first compression.

6. The compression garment of claim 1, wherein the terminal openings have a fastening element.

7. The compression garment of claim 1, wherein the compression sleeve is tapered to fit a hock or an ankle of the quadruped.

8. The compression garment of claim 7, wherein the compression sleeve provides compression to a rear metatarsal region and the hock of the quadruped.

9. The compression garment of claim 1, wherein the terminal openings are lined with a cuff, and wherein a material of the cuff is different than a material of the compression sleeve.

10. The compression garment of claim 1, wherein the compression sleeve is adjustable.

11. The compression garment of claim 1, wherein the compression sleeve wraps around the torso of the quadruped.

12. The compression garment of claim 11, wherein a compression material of the compression vest and/or the compression sleeve provides uniform or graded compression to limbs and the torso of the quadruped.

* * * * *